US008623166B2

(12) United States Patent
Gruber et al.

(10) Patent No.: US 8,623,166 B2
(45) Date of Patent: Jan. 7, 2014

(54) FLEXOGRAPHIC APPLICATION OF ADHESIVE DISPERSIONS

(75) Inventors: Bruce Gruber, Emmaus, PA (US); Monaca Flexer, Emmaus, PA (US); Mark Monahan, Allentown, PA (US)

(73) Assignee: Wacker Chemical Corporation, Adrian, MI (US)

( * ) Notice: Subject to any disclaimer, the term of this patent is extended or adjusted under 35 U.S.C. 154(b) by 346 days.

(21) Appl. No.: 12/273,115

(22) Filed: Nov. 18, 2008

(65) Prior Publication Data

US 2010/0122770 A1 May 20, 2010

(51) Int. Cl.

| | |
|---|---|
| ***B29C 65/00*** | (2006.01) |
| ***B32B 37/00*** | (2006.01) |
| ***B32B 38/14*** | (2006.01) |
| ***B29C 65/48*** | (2006.01) |
| ***B41F 33/00*** | (2006.01) |

(52) U.S. Cl.
USPC ............ 156/277; 156/295; 156/332; 101/483

(58) Field of Classification Search
USPC ........... 156/60, 196, 217, 218, 227, 277, 290, 156/291, 295, 314, 323, 327, 332, 384, 385, 156/386, 387, 388; 101/130, 141, 327, 328, 101/329, 330, 331, 335, 348, 349.1, 350.1, 101/483
See application file for complete search history.

(56) References Cited

U.S. PATENT DOCUMENTS

| | | | | |
|---|---|---|---|---|
| 3,613,578 | A * | 10/1971 | Heurich | 101/352.13 |
| 3,788,876 | A | 1/1974 | Baker et al. | |
| 4,361,089 | A * | 11/1982 | Wittkopf et al. | 101/182 |
| 4,968,993 | A * | 11/1990 | Wolfberg et al. | 347/118 |
| 5,250,492 | A * | 10/1993 | Dotson et al. | 503/201 |
| 6,153,278 | A * | 11/2000 | Timmerman et al. | 428/40.1 |
| 6,207,227 | B1 | 3/2001 | Russo et al. | |
| 6,396,036 | B1 * | 5/2002 | Hanson | 219/727 |
| 7,238,149 | B2 | 7/2007 | Lorenz et al. | |
| 2003/0226648 | A1 * | 12/2003 | McDonnell et al. | 162/123 |
| 2004/0029001 | A1 * | 2/2004 | Yamazaki et al. | 429/176 |
| 2004/0099388 | A1 * | 5/2004 | Chen et al. | 162/134 |
| 2004/0166238 | A1 | 8/2004 | Nowicki et al. | |
| 2004/0206446 | A1 | 10/2004 | Charley | |
| 2005/0100754 | A1 | 5/2005 | Moncla et al. | |
| 2006/0148628 | A1 * | 7/2006 | Lorenz et al. | 493/68 |
| 2006/0258553 | A1 * | 11/2006 | Catalfamo et al. | 510/302 |
| 2007/0007267 | A1 * | 1/2007 | Rayl et al. | 219/217 |
| 2007/0125246 | A1 * | 6/2007 | Dawley et al. | 101/147 |
| 2007/0292705 | A1 | 12/2007 | Moncla et al. | |
| 2009/0221408 | A1 * | 9/2009 | Cope et al. | 493/212 |

FOREIGN PATENT DOCUMENTS

| | | | |
|---|---|---|---|
| CN | 1413425 A | | 4/2003 |
| EP | 0712722 | | 5/1996 |
| JP | 9-131959 A2 | | 5/1997 |
| JP | 2002-145226 A | | 5/2002 |
| WO | WO 2007109153 A2 | * | 9/2007 |

OTHER PUBLICATIONS

Product Data Sheet for Duracet 12 DB. Franklin Adhesives & Polymers. Columbus, OH. 2003. Available online at http://www.franklinadhesivesandpolymers.com/Specialty-Polymers-World-wide/specialty-polymers/formulators/Duracet-12.aspx.*

Becker, Irina and Thomas, Vogel; "International Search Report"; Mar. 29, 2010; 9 pp; European Patent Office, Rijswijk, The Netherlands.

* cited by examiner

*Primary Examiner* — Philip Tucker
*Assistant Examiner* — Brian R Slawski
(74) *Attorney, Agent, or Firm* — RatnerPrestia

(57) ABSTRACT

A method of forming on a substrate an adhesive region that includes an adhesive composition employs steps of:

a) applying a dispersion of the adhesive composition in a solvent to an anilox roller on a flexographic press, said adhesive composition comprising an adhesive polymer;
b) contacting the anilox roller with a flexographic plate to transfer a portion of the dispersion thereto, said flexographic plate comprising an adhesive application region having a shape substantially matching that of the adhesive region on the substrate;
c) contacting the flexographic plate with the substrate to transfer the dispersion to the substrate; and
d) drying the dispersion on the substrate to form the adhesive region.

19 Claims, No Drawings

FLEXOGRAPHIC APPLICATION OF ADHESIVE DISPERSIONS

BACKGROUND OF THE INVENTION

Carton board is frequently printed with a flexographic process to provide images and/or text that will, upon folding the board and sealing the closures, form images and/or text on the finished carton. In flexographic printing, ink is transferred from an anilox roller, which picks up the ink from a reservoir and transfers the ink to a pattern roll for subsequent transfer to the carton board. In order to seal the carton, an adhesive must also be applied to designated spots on the board so that, when the board is folded into shape and heat is applied, the adhesive softens and seals the closures. However, adhesives must be deposited on the board at a much higher loading level than printing inks, and thus have typically been applied to the board in a separate operation, using coating equipment capable of delivering these higher loadings. Gravure rollers, doctor blades, nozzles and wheels are commonly used for this purpose. The use of such equipment requires a separate process that in turn often necessitates collecting the printed board and transporting it to the coating process, thus complicating operations and adding cost. For these and other reasons, methods of applying adhesives to printed board without requiring the use of separate equipment would be a welcome addition to the packaging industry.

SUMMARY OF THE INVENTION

The invention provides a method of forming on a substrate an adhesive region comprising an adhesive composition. The method includes:

a) applying a dispersion of the adhesive composition in a solvent to an anilox roller on a flexographic press, the adhesive composition including an adhesive polymer;

b) contacting the anilox roller with a flexographic plate to transfer a portion of the dispersion thereto, the flexographic plate including an adhesive application region having a shape substantially matching that of the adhesive region on the substrate;

c) contacting the flexographic plate with the substrate to transfer the dispersion to the substrate; and d) drying the dispersion on the substrate to form the adhesive region.

DETAILED DESCRIPTION OF THE INVENTION

The invention provides a method of applying an adhesive dispersion to a substrate. Typically, the substrate will be carton board although any other printable web material (e.g., paper, plastic film, or other) may also be similarly treated. For simplicity, the term “carton board” will be used hereinafter with the understanding that the discussion also applied to other substrates. The method uses a flexographic process, and can for example be conducted at one of the stations of a standard multi-station flexographic printing press which is also printing graphical images such as text or pictures on the substrate. When applied by flexography, the adhesive dispersion can be applied at the same time as graphic (ink) printing, saving an application step. Once dried to remove solvent (typically water), the pre-applied adhesive on the final printed board may subsequently be heat activated to seal a carton made from the board. The invention makes it possible to use a flexographic process to apply an adhesive at the loading levels required for effectiveness, levels that are significantly higher than the loading levels of inks delivered by flexographic printing. Adhesives applied in this way may be used in place of hot melt adhesives, for example for sealing paperboard cartons.

The inventors have found that application of a sufficient amount of adhesive in an even and well-controlled manner is difficult to achieve by a flexographic process using standard techniques. The majority of combinations of anilox rollers and flexographic plates result either in insufficient adhesive loading, or poor placement control due to pooling of the adhesive resulting from the high volumes required to be laid down on the board. The inventors have found that the use of high-volume anilox rollers in an effort to lay down a sufficient loading of adhesive can itself cause problems. Such rollers are typically highly abrasive, and act somewhat like a metal file on the doctor blade and therefore cause rapid wear.

It has now been found, however, that certain combinations of anilox design and flexographic plate configuration enable the user to transfer adhesive dispersion to desired regions of the board evenly and at high loading levels while using anilox rollers of relatively moderate volume. The inventors have found that a suitable flexographic plate should provide in the application region an average percent coverage in a certain range in order to provide sufficiently high adhesive loading while avoiding pooling of adhesive.

Pooling should be avoided because it results in adhesive dispersion being pushed ahead of the flexographic plate and ending up in areas of the substrate where no adhesive is desired. The pooling problem appears to result at least partially from the presence of the necessarily large loading of adhesive dispersion on the raised portions of the flexographic plate. The inventors have found that, when the plate contacts the substrate, the applied pressure causes most of the adhesive dispersion to be squeezed out of the contact area and flow into adjacent areas. This is essentially the opposite of what happens to an ink during flexographic printing, where most of the ink remains at points of actual contact. However, the inventors have found that nearly the opposite approach must be taken in applying adhesive dispersions in the large amounts needed. Therefore, flexographic plates for use according to the invention are designed to accommodate the large amount of squeeze-out that results from depositing such high loadings to the board so as so avoid pooling and flooding of the dispersion into unintended areas. If average percent coverage is kept below a certain level, the squeeze-out occurs locally and pooling is avoided.

Using the methods and devices of this invention, it is possible to deposit heavy loadings of adhesive at speeds of at least 100 ft/min, or at least 200 ft/min, or even at least 300 ft/min. No inherent upper limit is known, but the speed will generally not exceed that of a typical flexographic printing press. Thus, the speed will typically be at most 600 ft/min, or at most 500 ft/min. Such speeds are commensurate with a flexographic printing press, and in some embodiments the adhesive dispersion may be applied to the substrate at one of the stations of a printing press, typically after the ink stations. The applied adhesive weight may be at least 5 lb/ream (i.e., 5 lb/3000 $ft^2$), typically at least 6 lb/ream, and most typically at least 7 lb/ream on a dry weight basis. This is a much higher delivery level than for flexographic inks, which are typically delivered at about 0.7-1.5 lb/ream on a dry weight basis in printed regions.

Flexographic Plate

The flexographic plate is designed to lay down adhesive dispersion in one or more regions on the substrate of sufficient size to provide good adhesive performance, such as to secure the closures of a folded carton. The regions, regardless of the exact pattern used to apply them, will each typically cover an area of at least 0.06 $in^2$, and more typically at least 0.10 $in^2$. Even more typically, the adhesive regions will each cover at least 0.5 $in^2$, or at least 1.0 $in^2$, or at least 4.0 $in^2$. The regions are typically round or rectangular, but they may be of any shape.

The adhesive regions on the substrate are deposited by corresponding adhesive application regions on the flexographic plate. These may be of any shape, but typically circular or rectangular patches will be used. The inventors have found that an average percent coverage in the adhesive application region should typically not exceed 75%. In some cases, the coverage may be at most 65%, or at most 60%, 55% or 50% in order to avoid pooling. To provide sufficient adhesive deposition, the coverage will typically be at least 30%, or at least 35% or 40%. As used in this context, percent coverage refers to the flexographic plate pattern itself and not to the actual percentage of substrate surface in the adhesive deposition region that ends up bearing adhesive on it. As noted above, much of the adhesive dispersion is squeezed into areas adjacent the actual plate-substrate contact areas, and so the fraction of the area within a given region actually covered by adhesive will typically be significantly larger than that defined by the contact area of the dots in the halftone areas of the flexographic plate.

One suitable way of providing the right average coverage is to use a flexographic plate pattern consisting of alternating heavy and light stripes. In this case, the average percent coverage across the adhesive application region on the plate is simply the weighted average of the percent coverage in the heavy and light areas. For example, if the heavy stripes have a coverage of 90% (i.e., are produced with a 90% grayscale screen) and the light stripes are of equal width and at 0% coverage, the average coverage is 45%. The stripes may run longitudinally, i.e., in the direction of web motion, or they may run in a transverse direction or at an intermediate angle. The stripes may be straight or curved, and may be narrow without any particular limit. Typically, they will be at least 1/64" wide, or at least 1/32", 1/16", or 1/8" wide. Typically, they will be at most 1/2" wide, or at most 1/4" wide, in order to avoid pooling.

The heavy and light stripes may be of the same or different width. Typically, the ratio of the width of an individual heavy stripe to that of a light stripe will be at least 1:2, or at least 3:4, or at least 9:10. Typically the ratio will be at most 2:1, or at most 4:3, or at most 10:9. All of these ratios also apply to the total cumulative heavy stripe width across the adhesive application region, relative to the total cumulative light stripe width. In some cases, but not all, the heavy stripes will all be of the same width.

The heavy stripes may be at least 50% solid, or at least 60, 70, 80, or 90% solid, or even 100% solid. The light stripes may be at most 40% solid, or at most 30, 20, or 10% solid, or even 0% solid.

The stripes may be printed at any number of lines per linear inch, using dots of any shape. Typically, about 65-150 lpi (lines/linear inch) will be used. Exemplary dot shapes include elliptical, round, and square. The lines may be at any cell angle, but will typically range from about 170 to 900.

A checkerboard or other pattern may also be used to provide an average coverage within the ranges described above. The percent coverage of the features, and their width, for the checkerboard or other pattern may be as described above with respect to stripes. Or, simple unbroken halftone regions may be applied without being divided into stripes or other such features.

Anilox Roller

Anilox rollers suitable for use according to the invention should be of relatively moderate volume. The volume of a roller is measured in billion cubic microns/$in^2$ (BCM), and suitable values will typically be at least 25 BCM, and more typically at least 30 BCM. The volume will typically be at most 55 BCM, and more typically at most 45 or 40 BCM. However, volumes as high as 60 or 65 BCM may be used in some situations. Any anilox pattern known in the art may be used according to the invention. One suitable exemplary pattern is a trihelical roller. Also suitable are 45° quad or 30° or 60° hexagonal configurations. Suitable CPI (cells per linear inch) values are typically at least 30 CPI or at least 35 CPI. Typical upper values are 55 CPI or 50 CPI. Generally, the value will be in a range from 30-45 CPI.

Adhesive Dispersion

The adhesive is provided in the form of a dispersion of an adhesive composition. The term "dispersion" is to be understood to include solutions, emulsions, latexes, microemulsions, and the like. In many embodiments, the adhesive dispersion will be an aqueous emulsion or dispersion, although other solvents may be used instead or in addition. As used herein, the term "aqueous" means that the solvent is at least 50 wt % water. The adhesive composition, by which is meant the entire non-solvent portion of the dispersion, comprises one or more adhesive resins. In some embodiments, the presence of other materials such as tackifiers, pigments, dyes, waxes and alkyds may be undesirable to the functioning of the adhesive, and in such cases it may be desirable to exclude any or all of these from the adhesive dispersion.

One exemplary adhesive resin dispersion is an ethylene-vinyl acetate (EVA) dispersion sold by Wacker Chemical Corporation of Allentown, Pa. under the trade name Airflex® EF9900. The inventors have found that this adhesive typically gives little or no surface tack, thus facilitating handling, but provides high adhesive strength in use. Other EVA polymers may also be used, for example those disclosed in U.S. Pat. No. 7,238,149, the entire contents of which are incorporated herein by reference. Typical suitable adhesive dispersions have a viscosity from 150 to 1000 cps, more typically from 300-700 cps, and typically have a solids content of 45 wt % to 55 wt %. In some embodiments, the adhesive polymer used in the dispersion has a crystalline melting point $T_m$ in a range from 35° C. to 110° C., more typically 50° C. to 90° C., as measured by differential scanning calorimetry (DSC) at a heating rate of 20°/min. Typically, the polymer will have a tensile storage modulus of at least $1\times10^4$ dynes/$cm^2$ at 115° C., measured at 6.28 rad/sec as described in U.S. Pat. No. 7,238,149. In some embodiments, the polymer has a heat of fusion ($\Delta H_f$) in a range from 5-100 joules/gram, more typically 15-70 joules/gram, as measured by DSC at a heating rate of 20°/min. Typically, the polymer will comprise from 15 to 90% by weight of polymerized units of vinyl acetate and from 10 to 85% by weight of polymerized units of ethylene, based upon the total weight of the polymer. More typically, there will be from 25 to 80% by weight of vinyl acetate units and from 20 to 75% by weight of ethylene units, based upon the total weight of the polymer. In some embodiments, the polymer is an ethylene vinyl acetate adhesive polymer that comprises 15 to 80% by weight of polymerized units of vinyl acetate, 20 to 85% by weight of polymerized units of ethylene, and 0 to 10% by weight of polymerized units of another monomer, based on the total weight of the polymer. In some embodiments, the other monomer will be an unsaturated carboxylic acid. Nonlimiting examples include alkenoic acids such as acrylic acid, methacrylic acid, crotonic acid, and isocrotonic acid, and alpha, beta-unsaturated alkenedioic acids such as maleic acid, fumaric acid, and itaconic acid. If present in the ethylene vinyl acetate adhesive polymer, these acids are typically incorporated in an amount of from 0.2 to 10% by weight, more typically 0.5 to 5% by weight.

Other suitable adhesives include thermoplastic resins provided as aqueous dispersions, such as described in U.S. Pub. Nos. 2005/0100754 A1 and 2007/0292705 A1. For example, such dispersions may include a dispersed polymer phase having a volume average particle size of less than about 5 microns. Suitable thermoplastic resins include ethylene-based polyolefins and propylene-based polyolefins, including copolymers.

Application of Adhesive Dispersion

The adhesive dispersion may be applied using a standard flexographic printing press. This may be done either alone or on the same press that is used to print ink images. In the latter situation, the adhesive dispersion will typically be applied after the inks have been printed, although this need not be the case. After application of the dispersion, the carton board will typically be passed through a drying oven to evaporate the solvent and provide the dry adhesive composition in the form of adhesive regions on the board. The shapes of the adhesive regions substantially match those of the adhesive application regions on the flexographic plate.

EXAMPLES

All application rates are given in lbs/ream dry basis, where a ream is 3000 $ft^2$.

Comparative Example 1

A flexographic plate was prepared, having a series of 1"×10" solid rectangles oriented longitudinally, as well as 1"×1" and ½"×½" solid squares, all at a 100% screen value. The plate was mounted on a 16" COMMANDER® flexographic printing press, available from Comco Machinery Inc. of Milford, Ohio equipped with a 50-line trihelical anilox roller of nominal 56-65 BCM capacity, obtained from Harper Corporation of Charlotte, N.C. Based on the anilox capacity, the expected coating weight was about 9 lb/ream. The adhesive dispersion was Airflex® EF 9900, adjusted to 53% solids, applied to SBS board at a line speed of 120 ft/min and then run through a hot air dryer. The actual measured dry coating weight was only 3.3 lb/ream, measured in the interior of the printed rectangles. There was a large buildup of adhesive at the edges of the rectangle, due to pooling of squeezed-out adhesive dispersion resulting from the pressure applied to the flexographic plate during the application process. Significant pooling had also occurred at the leading edges of the rectangles and squares, resulting in the presence of a tapered pattern of adhesive extending beyond the leading edges. The pattern extended more than one inch beyond the leading edge of the 1"×10" solid rectangles, and nearly one inch beyond the leading edge of the 1"×1" solid squares. Even the ½"×½" solid squares had nearly 0.5 inch of adhesive extending beyond the desired square deposition area.

Example 2

A flexographic plate was prepared, bearing several approximately 1"×10" rectangles consisting of longitudinal 100% screen stripes alternating with 0% screen stripes (i.e., blank areas). The outermost stripes were the 100% screen stripes. The rectangles were oriented longitudinally, and SBS board was treated as in Comparative Example 1. The measured coating weight was 6 lb/ream, much higher than that obtained in Comparative Example 1 using solid 100% screen rectangles. The resulting patterns showed only a very small amount of adhesive extending beyond the leading edge of the rectangles, and noticeably less buildup along the long sides of the rectangles. Instead, significant amounts of adhesive dispersion appeared to have flowed into the blank areas adjacent the 100% screen stripes, with relatively little adhesive dispersion remaining in the areas where the 100% screen stripes actually contacted the board.

Comparative Example 3

A flexographic plate was prepared, bearing three approximately 1"×10" rectangles consisting of five ⅛" longitudinal 100% screen stripes alternating with four ⅛" 30% screen stripes. The outermost stripes were the 100% screen stripes. The rectangles were prepared at values of 100, 133 and 150 lpi, and were oriented longitudinally. SBS board was treated as in Comparative Example 1, but at a line speed of 140 ft/min. There was a large buildup of adhesive at the edges of the rectangle. Significant pooling was found at the leading edges of the rectangles, resulting in the presence of a tapered pattern of adhesive extending about one inch beyond the leading edges.

Comparative Example 4

A flexographic plate was prepared, bearing four approximately 1"×10" rectangles. Two rectangles consisted of ⅛" longitudinal 80% screen stripes alternating with ⅛" 20% screen stripes. In one rectangle the outermost stripes were the 80% screen stripes, i.e. five 80% stripes alternating with four 20% stripes, and in the other rectangle the pattern was reversed. The other two rectangles were analogous, but had values of 90% and 30%. All four rectangles were prepared at a value of 133 lpi, and were oriented longitudinally. SBS board was treated as in Comparative Example 1, but at a line speed of 140 ft/min. There was a large buildup of adhesive at the edges of the rectangle. Significant pooling was found at the leading edges of the rectangles, resulting in the presence of a tapered pattern of adhesive extending about one inch beyond the leading edges.

Comparative Example 5

A flexographic plate was prepared, bearing four approximately 1"×10" rectangles as in Comparative Example 4, except that the value was 150 lpi. Testing was performed in the same manner as Comparative Example 1, but at a line speed of 140 ft/min. There was a large buildup of adhesive at the edges of the rectangle. Significant pooling was found at the leading edges of the rectangles, resulting in the presence of a tapered pattern of adhesive extending nearly an inch beyond the leading edges.

Example 6

A flexographic plate was prepared, bearing four approximately 1"×10" rectangles. Two rectangles consisted of ten 1⁄16" longitudinal 50% screen stripes alternating with nine 1⁄16" 0% screen stripes, with the heavy stripes outermost. One was prepared at 100 lpi, and the other at 150 lpi. The other two rectangles were analogous, but had values of 75% and 0%. All four rectangles were oriented longitudinally. SBS board was treated as in Comparative Example 1, but at a line speed of 140 ft/min. There was no noticeable buildup of adhesive at the edges of the rectangle. Essentially no pooling was found at the leading edges of the rectangles, and essentially no adhesive extending beyond the leading edges. Coating weights for the patterns, in the order presented above, were 5.3, 7.4, 6.2 and 5.7 lb/ream, respectively.

Example 7

A flexographic plate was prepared, bearing two approximately 1"×10" rectangles. The rectangles consisted of ten 1/16" longitudinal 50% screen stripes alternating with nine 0% screen stripes, with the heavy stripes outermost. The two rectangles had 0% stripes of 1/32" and 1/16" width, respectively. The heavy stripes were prepared at 100 lpi, and the rectangles were oriented longitudinally. SBS board was treated as in Comparative Example 1, providing a coating weight of >5 lbs/ream for all rectangles. The rectangles showed no noticeable buildup of adhesive at the edges of the rectangle. Essentially no pooling was found at the leading edges of the rectangles, and essentially no adhesive extended beyond the leading edges.

Comparative Example 8

Two rectangles were prepared and evaluated as in Example 7, but they had 0% stripes of 1/64" and 3/128" width, respectively. The coating weight provided by the rectangle with 1/64" stripes was 7.7 lbs/ream, while the one with 3/128" stripes gave a deposition pattern that could not be measured. Significant buildup and pooling was found with these rectangles, and substantial extension of adhesive was found beyond the leading edge.

Example 9

A cardboard cutout designed to be folded into a carton to contain two golf balls was treated an a flexographic press as in Example 1, except for the following differences. Auxiliary drying was performed with a XericWeb 15" (l)×12" (w) dryer mounted with the width in the machine direction, containing 9 medium-wave infrared lamps with impingement air. The anilox roller was a 64 BCM quad roller, and the press speed was approximately 300 ft/min. The adhesive was laid down at several locations on the foldable cardboard cutout using a flexographic plate pattern that consisted of alternating 1/16" heavy and light stripes at 100% and 0%, respectively. Deposition of the adhesive was found to be very precise, with essentially no adhesive showing up in unintended places on the cutout. It appeared that higher press speeds would have been possible, but the drying capacity of the equipment was not able to handle such higher speeds.

Example 10

A flexographic plate was prepared, having a 5×3 array of rectangular blocks representing five different halftone dot patterns for each of three anilox settings. No heavy and light stripes were used, but rather the spaces between the dots served the same function as the light stripes. That is, they accommodated adhesive dispersion that was squeezed out of the contact area where a dot pressed against the board. The patterns were as follows:

#1: 65 lpi, 45% screen, square “dots”, 75°.

#2: Top half same as #1, bottom half with 3 mil lines running in web direction, separated by blank areas.

#3: 65 lpi, 40% screen, square “dots”, 90°.

#4: 45 lpi, 10% screen, square “dots”, 90°.

#5: Top half, 65 lip, 10% screen, square “dots”, 90°, bottom half, 3 mil lines with equal spacing running in web direction.

#6: 5 mil lines in a diamond pattern with a 1/16" wide blank band running across the middle (i.e. connecting opposite corners of he diamond) perpendicular to the web direction.

The plate was mounted on a Mark Andy 4150, 5-station flexographic press, equipped with a banded anilox roller obtained from Harper Corporation. The roller had the following three bands, all in a 45° quad design:

Band 1—40 CPI, 45 BCM

Band 2—45 CPI, 40 BCM

Band 3—45 CPI, 35 BCM

Adhesive dispersion (the same as used in Comparative Example 1) was applied at the 3$^{rd}$ station of the press, which was run at 100 ft/min. Coating weights were estimated from coating thicknesses, which were measured by micrometer. The micrometer readings and estimated weights were as follows.

| Pattern | Micrometer Readings (mil) | Estimated lb/ream |
|---|---|---|
| #1: | 1.3-1.6 | 8.8 |
| #2: | 1.3-1.4 | 7.3 |
| #3: | 0.35-0.44 | 2.9 |
| #4: | 0.63-1.1 | <2.9 |
| #5: | 0.67-0.67 | <2.9 |
| #6: | 1.1-1.1 | 7.3 |

All of the patterns provided only a small amount of adhesive extending beyond the leading edge of the rectangles, and very little buildup along the long sides of the rectangles. Pattern #1 and related pattern #2 provided the best overall results, due to the high adhesive delivery. For these patterns, significant amounts of adhesive dispersion appeared to have flowed into the blank areas adjacent the dots that made up the rectangles. However, essentially no adhesive dispersion flowed into the lined area of pattern #2 or #5, and thus, there was essentially no pooling and resultant flow of adhesive dispersion into areas ahead of the leading edge of the halftone rectangles. The variations in anilox configuration did not have a great effect in these runs. Thus, flexographic plates employing adhesive application regions of undivided halftone areas within a suitable percent screen range can provide good adhesive delivery according to the invention.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. A method of forming on a substrate an adhesive region comprising a heat-activatable adhesive composition, the method comprising:

a) applying a dispersion of the heat-activatable adhesive composition in a solvent to an anilox roller on a flexographic press, said heat-activatable adhesive composition comprising an adhesive polymer;

b) contacting the anilox roller with a flexographic plate to transfer a portion of the dispersion thereto, said flexographic plate comprising an adhesive application region having a shape substantially matching that of the adhesive region on the substrate;

c) contacting the flexographic plate with the substrate to transfer the dispersion to the substrate; and d) drying the dispersion on the substrate to form the adhesive region;

wherein the method is performed at a station on a multi-station flexographic printing press during a press run that additionally produces graphic images on the substrate, wherein the method produces a printed substrate having the graphic image thereon and having the adhesive region on an external surface thereof, available for subsequent adhesion of the heat-activatable adhesive composition to another surface, and wherein the adhesive application region has an average coverage in a range from 35% to 65%.

2. A method of forming on a substrate an adhesive region comprising a heat-activatable adhesive composition, the method comprising:

a) applying a dispersion of the heat-activatable adhesive composition in a solvent to an anilox roller on a flexographic press, said heat-activatable adhesive composition comprising an adhesive polymer;

b) contacting the anilox roller with a flexographic plate to transfer a portion of the dispersion thereto, said flexographic plate comprising an adhesive application region having a shape substantially matching that of the adhesive region on the substrate;

c) contacting the flexographic plate with the substrate to transfer the dispersion to the substrate; and d) drying the dispersion on the substrate to form the adhesive region;

wherein the method is performed at a station on a multi-station flexographic printing press during a press run that additionally produces graphic images on the substrate, wherein the method produces a printed substrate having the graphic image thereon and having the adhesive region on an external surface thereof, available for subsequent adhesion of the heat-activatable adhesive composition to another surface, and wherein the adhesive application region consists of an unbroken halftone area.

3. The method of claim 2, wherein the screen value of the halftone is in a range from 35% to 65%.

4. A method of forming on a substrate an adhesive region comprising a heat-activatable adhesive composition, the method comprising:

a) applying a dispersion of the heat-activatable adhesive composition in a solvent to an anilox roller on a flexographic press, said heat-activatable adhesive composition comprising an adhesive polymer;

b) contacting the anilox roller with a flexographic plate to transfer a portion of the dispersion thereto said flexographic late comprising an adhesive application region having a shape substantially matching that of the adhesive region on the substrate;

c) contacting the flexographic plate with the substrate to transfer the dispersion to the substrate; and d) drying the dispersion on the substrate to form the adhesive region;

wherein the method is performed at a station on a multi-station flexographic printing press during a press run that additionally produces graphic images on the substrate, wherein the method produces a printed substrate having the graphic image thereon and having the adhesive region on an external surface thereof, available for subsequent adhesion of the heat-activatable adhesive composition to another surface, and wherein the adhesive application region comprises alternating heavy stripes and light stripes, said heavy stripes having a screen value in a range from 50% to 100% and said light stripes having a screen value in a range from 0% to 40%.

5. The method of claim 4, wherein a ratio of the width of a heavy stripe to a light stripe is in a range from 1:2 to 2:1.

6. The method of claim 4, wherein the heavy and light stripes each have a width in a range from 1⁄32" to 1⁄8".

7. The method of claim 4, wherein the heavy and light stripes are oriented parallel to the direction of web motion on the press.

8. The method of claim 1, wherein the anilox roller has a volume in a range from 25 BCM to 65 BCM.

9. The method of claim 1, wherein the anilox roller has a volume in a range from 30 BCM to 40 BCM.

10. The method of claim 1, wherein the heat-activatable adhesive composition in the adhesive region is present at a loading of at least 5 lb/3000 $ft^2$.

11. A method of forming on a substrate an adhesive region comprising a heat-activatable adhesive composition, the method comprising:

a) applying a dispersion of the heat-activatable adhesive composition in a solvent to an anilox roller on a flexographic press, said heat-activatable adhesive composition comprising an adhesive polymer;

b) contacting the anilox roller with a flexographic plate to transfer a portion of the dispersion thereto, said flexographic plate comprising an adhesive application region having a shape substantially matching that of the adhesive region on the substrate;

c) contacting the flexographic plate with the substrate to transfer the dispersion to the substrate; and d) drying the dispersion on the substrate to form the adhesive region;

wherein the method is performed at a station on a multi-station flexographic printing press during a press run that additionally produces graphic images on the substrate, wherein the method produces a printed substrate having the graphic image thereon and having the adhesive region on an external surface thereof, available for subsequent adhesion of the heat-activatable adhesive composition to another surface, and wherein the substrate comprises carton board.

12. The method of claim 1, wherein the dispersion is an aqueous dispersion.

13. The method of claim 1, wherein the dispersion has a viscosity in a range from 150 to 1000 cps.

14. The method of claim 1, wherein the heat-activatable adhesive composition comprises an ethylene-based polyolefin or a propylene-based polyolefin.

15. The method of claim 1, wherein the adhesive polymer comprises an ethylene-vinyl acetate polymer.

16. The method of claim 15, wherein the ethylene-vinyl acetate polymer has a crystalline melting point in a range from 35° C. to 110° C. and a tensile modulus of at least $1\times10^4$ dynes/$cm^2$ at 115° C.

17. The method of claim 15, wherein the ethylene-vinyl acetate polymer has a heat of fusion in a range from 5-100 joules/gram.

18. The method of claim 15, wherein the ethylene-vinyl acetate polymer comprises from 15 to 90% by weight of polymerized units of vinyl acetate and from 10 to 85% by weight of polymerized units of ethylene, based upon the total weight of the polymer.

19. The method of claim 15, wherein the ethylene-vinyl acetate polymer comprises from 15 to 80% by weight of polymerized units of vinyl acetate, 20 to 85% by weight of polymerized units of ethylene, and 0.2 to 10% by weight of polymerized units of an unsaturated carboxylic acid, based on the total weight of the polymer.

* * * * *

UNITED STATES PATENT AND TRADEMARK OFFICE

CERTIFICATE OF CORRECTION

PATENT NO. : 8,623,166 B2
APPLICATION NO. : 12/273115
DATED : January 7, 2014
INVENTOR(S) : Gruber et al.

It is certified that error appears in the above-identified patent and that said Letters Patent is hereby corrected as shown below:

In the Claims

Column 9, line 50-51, in claim 4, "flexographic late comprising an adhesive" should read
-- flexographic plate comprising an adhesive --

Signed and Sealed this
Twentieth Day of May, 2014

Michelle K. Lee
*Deputy Director of the United States Patent and Trademark Office*